United States Patent [19]
Bakis

[11] Patent Number: 5,054,074
[45] Date of Patent: Oct. 1, 1991

[54] OPTIMIZED SPEECH RECOGNITION SYSTEM AND METHOD

[75] Inventor: Raimo Bakis, Yorktown Heights, N.Y.

[73] Assignee: International Business Machines Corporation, Armonk, N.Y.

[21] Appl. No.: 586,338

[22] Filed: Sep. 17, 1990

Related U.S. Application Data

[63] Continuation of Ser. No. 318,042, Mar. 2, 1989, abandoned.

[51] Int. Cl.[5] .............................................. G10L 5/00
[52] U.S. Cl. ........................................ 381/41; 381/43; 364/513.5
[58] Field of Search ................................ 381/41–43; 364/513.5

[56] References Cited

U.S. PATENT DOCUMENTS 4,363,102 12/1982 Holmgren et al. .
4,559,604 12/1985 Ichikawa et al. .
4,759,068 7/1988 Bahl et al. .

OTHER PUBLICATIONS

E04KDF-NAG Fortran Library Routine Document (pp. 1–18).

Primary Examiner—Emanuel S. Kemeny
Attorney, Agent, or Firm—Marc D. Schechter

[57] ABSTRACT

A speech recognition system estimates a set of Poisson intensities for a spoken word, each intensity representing a respectively different word from a vocabulary of words. Each of the functions used to calculate these intensities has two variable parameter values. In a training mode, the system changes the values of the respective variable parameters to optimize the likelihood that the results predicted by the estimates correspond to the actual spoken words. These optimized parameter values are then used by the system, in an operational mode, to recognize spoken words.

8 Claims, 7 Drawing Sheets

PRIOR ART FIG.1

AUXILIARY SPEECH RECOGNIZER 1030

OPTIMIZED SPEECH RECOGNITION SYSTEM AND METHOD

This is a continuation of application Ser. No. 318,042, filed Mar. 2, 1989, now abandoned.

BACKGROUND OF THE INVENTION

1. Field of the Invention

The present invention relates generally to the field of speech recognition and specifically to a speech recognition system which is optimized for distinguishing between similar utterances.

2. Description of the Prior Art

Most speech recognition systems operate, at least at a high level of abstraction, in substantially the same manner. Spoken words are converted to electrical signals which are then analyzed to generate a sequence of tokens representing specific sounds. These tokens are then analyzed to determine which word or words correspond to the sequence of tokens. The words so determined are provided as the output of the speech recognition system.

Due to variations in the pronunciation of individual words by a single speaker in different contexts and the even larger variations in pronunciation among several speakers, the actual methods used for speech recognition are highly probabilistic. Consequently, a given word spoken in a slightly different manner by one speaker, or by different speakers, can be correctly identified by the speech recognition system as long as it stays within the probabilistic model of the given word and, as long as there is no significant overlap between the model of the given word and a model representing a similar but different word.

Many speech recognition systems recognize that the overlap of similar word models is inevitable and use a model of the spoken language to distinguish between similar words based on the context in which the word appears. These models may, for example, check a sequence of spoken words for grammatical correctness or for likelihood of occurrence based on a relatively large text sample.

In spite of these techniques, some words which sound alike may still be difficult to identify if there is no context base which may be used to determine their likelihood of occurrence, or if they occur interchangeably with similar words in substantially identical contexts. Exemplary words of this type of are the names of the letters B, C, E, G, P, T, V and Z. These words are of particular importance because many speech recognition systems include a mode which allows the speaker to spell a word which is not likely to be in the dictionary of words recognized by the system. In this mode, the language model may not be helpful, even if it were designed to include English language spelling conventions, if the spelled word is a foreign word which does not follow English language spelling conventions. Moreover, even if the spelled word were an English word, it would be difficult for the language model to encompass the relatively large number of English language spelling rules.

U.S. Pat. No. 4,759,068 to Bahl et al. relates a method by which a string of tokens derived from spoken words are analyzed to derive a sequence of individual fenemes which most closely corresponds to the spoken words. This patent discloses the structure of a typical speech recognition system in detail.

U.S. Pat. No. 4,559,604 to Ichikawa et al. relates to a pattern recognition system in which an input pattern is compared against a set of standard patterns to define a set of patterns that are more likely than any other patterns to be a match for the input pattern. A specific one of these selected patterns is inferred as the most likely based on one of four preferred criteria of inference.

U.S. Pat. No. 4,363,102 to Holmgren et al. relates to a speaker identification system which develops a plurality of templates corresponding to known words spoken by a corresponding plurality of speakers. An individual speaker is identified as having the smallest probabilistic distance between his spoken words and the templates corresponding to one of the known speakers.

SUMMARY OF THE INVENTION

It is an object of the present invention to provide apparatus and a method for accurately identifying words which may be confused because of their similar pronunciation and similar contextual environments.

It is a further object of the present invention to provide apparatus and a method for automatically optimizing a speech recognition system for a particular set of words to be recognized.

It is yet another object of this invention to provide apparatus and a method for distinguishing between a relatively small number of similar words for use as an auxiliary speech recognition system in association with a more general speech recognition system.

The present invention is embodied in a speech recognition system in which signals representing known spoken words are classified in accordance with a number of adjustable parameters. The classification values produced are compared against target classification values obtained from the known spoken words in accordance with an objective function. The adjustable parameters are then modified to optimize the objection function, thereby optimizing the performance of the speech recognition system.

According to a further aspect of the invention, a speech recognition system programmed with the modified parameters derived for a set of known spoken words is used in conjunction with a more general speech recognition system to assist the general system in determining the identity of a spoken word from said set of known spoken words.

DETAILED DESCRIPTION

Figure 1:
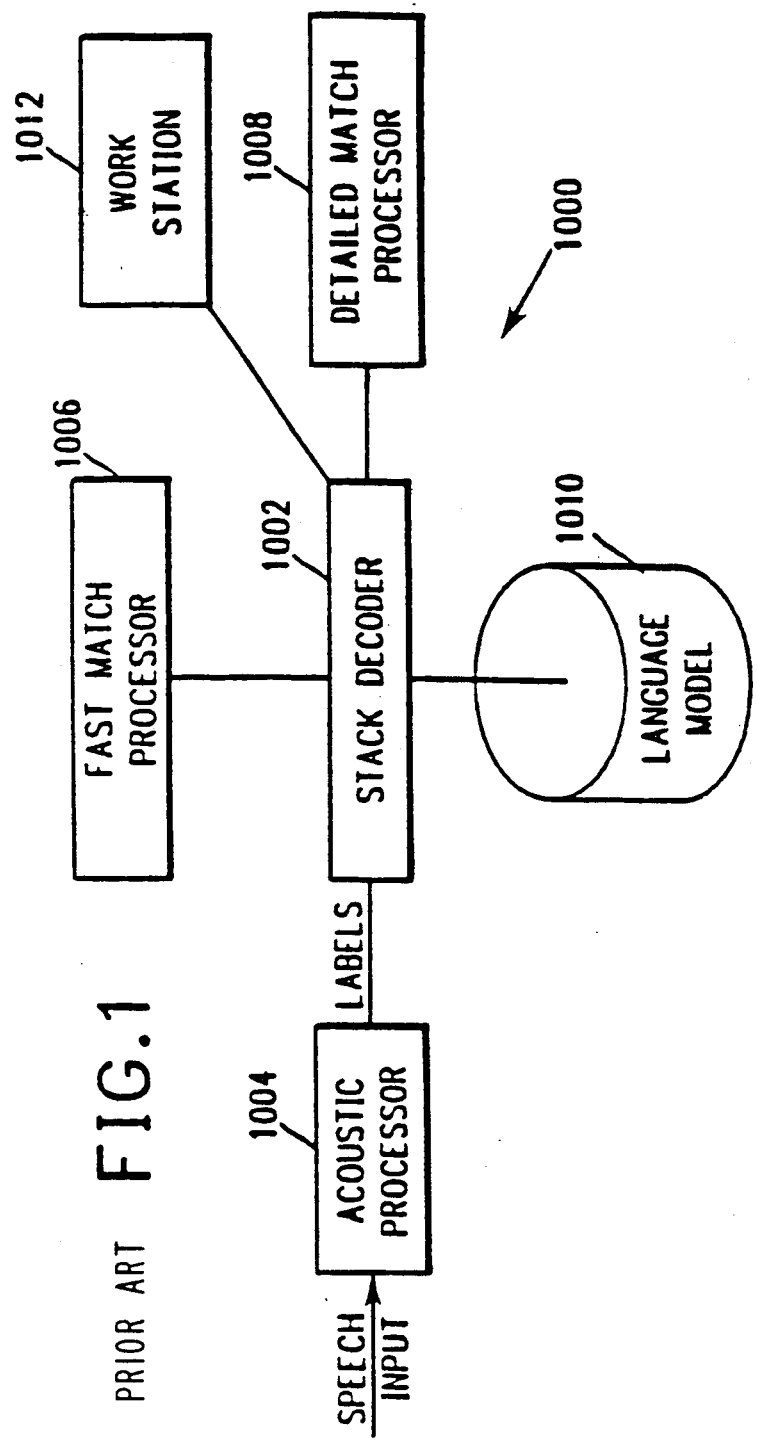
FIG. 1 (prior art) is a block diagram of a known speech recognition system.

FIG. 1 is a block diagram of a speech recognition system such as is disclosed in U.S. Pat. No. 4,759,068 to L. R. Bahl et al. which is hereby incorporated by reference. This system is described briefly below and then, as appropriate, selected aspects of the system are described in more detail.

In the system shown in FIG. 1, speech input, provided by a microphone and amplifier (not shown) are applied to an acoustic processor 1004. The processor 1004 analyzes the spectral characteristics of speech input over a succession of 1 centisecond intervals and assigns a label to each interval. The labels, also known as fenemes, are selected by the acoustic processor from an alphabet of distinct labels based on some combination of characteristics of the input speech during the centisecond intervals.

The labels produced by the acoustic processor 1004 are applied to a stack decoder 1002. The decoder 1002 interfaces with a fast match processor 1006, a detailed match processor 1008, a language model 1010 and a work station 1012. The decoder 1002 is controlled via the work station 1012 to condition the detailed and fast match processors 1008 and 1006 and the language model 1010 to transform the sequence of fenemes into a sequence of words.

The fast match processor 1006 and the detailed match processor 1008 use respectively different sets of probabilistic finite state machines, called phone machines, to associate the feneme sequences with words from a fixed vocabulary. The fast match processor 1006 uses a set of relatively crude phone machines to quickly select a few of the more likely words from the vocabulary. The detailed match processor uses a more rigorous set of phone machines to select a most likely word from the few provided by the fast match processor.

Since the fast match processor 1006 and detailed match processor 1008 produce matches based only on the speech input during the time interval occupied by a spoken word, the words produced are in terms of their phonetic content. Consequently, the output values provided by the detailed match processor may represent a group of homophones or a group of words which, even though they are not homophones, are so similar that they cannot be reliably distinguished on the basis of the signals provided by the acoustic processor using the probabilistic techniques employed by the detailed match processor. Words in this type of group are referred to below as near-homophones.

The language model 1010 is used to determine which word is correct from a group of homophones or near-homophones. The language model 1010, used in this embodiment of the invention, determines which word of a group is the most likely based on the preceding two words derived by the speech recognition system. The words determined by this language model analysis are the output of the speech recognition system.

Figure 2:
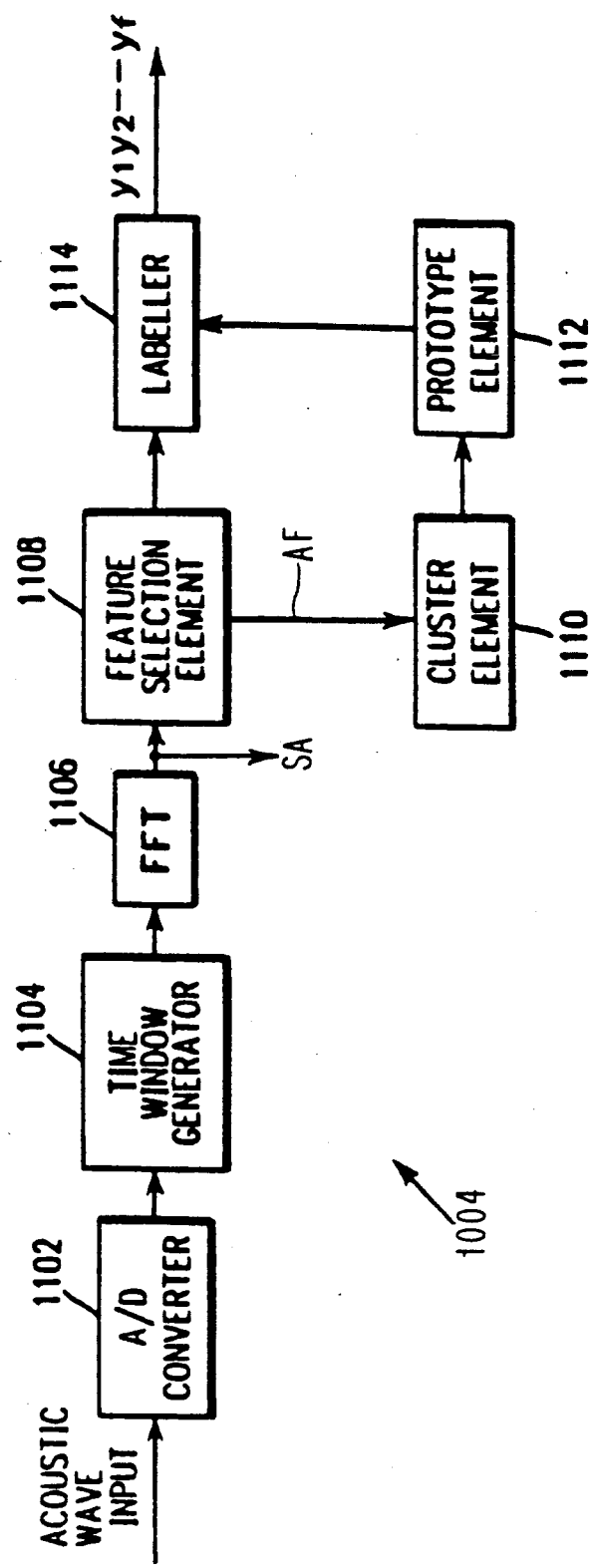
FIG. 2 (prior art) is a block diagram of an acoustic processor suitable for use with the speech recognition system shown in FIG. 1.

FIG. 2 is a block diagram of apparatus suitable for use as the acoustic processor 1004. In FIG. 2, an analog electrical signal, representing an acoustic wave input (e.g. natural speech), is applied to an analog-to-digital converter (ADC) 1102. The ADC 1102 develops digital samples representing the acoustic wave at a prescribed rate. A typical sampling rate is one sample every 50 microseconds. The samples provided by the ADC 1102 are applied to a time window generator 1104 which divides the digital samples into overlapping groups of 400 samples and shapes their edges. The groups of digital samples provided by the time window generator 1104 are applied to a fast Fourier transform (FFT) element 1106. The FFT element 1106 processes the sample groups to provide a signal SA which includes a sequence of spectral vectors. Each of these vectors may be, for example, a set of 200 output signals which represent the power of the acoustic wave in 200 mutually distinct frequency bands, respectively. Each set of values provided by the FFT element is a vector which represents the power spectrum of the acoustic wave during a 10 millisecond (1 centisecond) interval.

The signal SA provided by the FFT element 1106 is then processed to produce labels (or fenemes), y1, y2, . . . yf. Four processing elements, a feature selection element 1108, a cluster element 1110, a prototype element 1112, and a labeller 1114, act together to produce the labels from the signal SA. These elements operate in two modes, a training mode and a labeling mode. In both modes, the feature selection element 1108 combines selected values of the vector signal SA to generate a vector, AF, of acoustic feature signals. In addition to the amplitude of the acoustic signal at a particular frequency, an element in the acoustic feature vector may represent, for example, the overall loudness of the signal; the loudness in a particular band of frequencies; or an indication of when the acoustic input is above a threshold of feeling, $T_f$ or a threshold of hearing, $T_h$.

In the training mode, the acoustic feature vectors produced from a relatively large set of acoustic inputs are generated and stored in the cluster element 1110. If each of these stored vectors is considered to be a point in a state-space defined by a state vector of possible acoustic features, then the set of all points produced by the training data may be grouped into clusters of points in the state-space. Each point in a given cluster represents a one centisecond sample of a vocal sound which is statistically similar to the sound represented by the other points in the cluster.

Each of the clusters in the state-space may be thought of as a being representative samples of a probability distribution. Each of these probability distributions, which may, for example be assumed to be Gaussian distributions, defines a prototype for a label or feneme. When the acoustic processor 1004 is in its training mode, the cluster element provides the clusters to the prototype element which fits a Gaussian distribution to each cluster, defining a prototype label which represents all points in the cluster. When the acoustic processor is in its labeling mode, these prototypes are used by the labeller 1114 to assign labels to the feature vectors produced by the feature selection element 1108. An exemplary system for generating prototype labels in this manner is disclosed in a paper by A. Nadas et al., "Continuous Speech Recognition With Automatically Selected Acoustic Prototypes Obtained By Either Bootstrapping Or Clustering", Proceedings ICASSP 1981, pp. 1153–1155.

Figure 3:
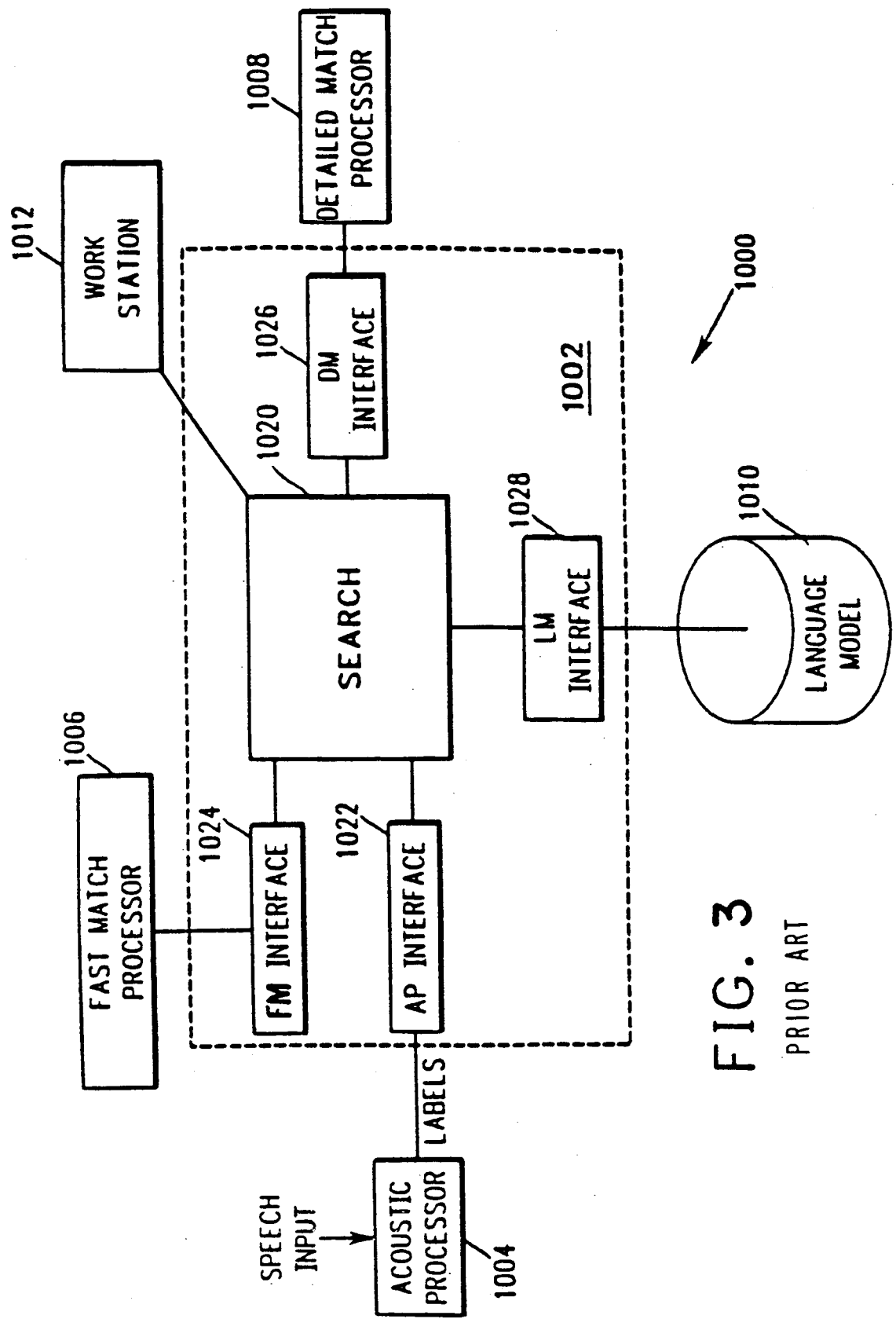
FIG. 3 (prior art) is a block diagram of the speech recognition system shown in FIG. 1 showing more detail of the stack processor element.

FIG. 3 is a block diagram of the speech recognition system shown in FIG. 1 but showing the stack decoder 1002 in greater detail. The central element in the stack decoder is a search processor 1020. As set forth above, when a sequence of labels is applied to the stack decoder, the search processor 1020 first applies it to the fast match processor 1006. The processor 1006 eliminates all but a few of the more likely words in the vocabulary as matches for the sequence of labels. The words determined by the fast match processor 1006 are then applied by the search processor 1020 to the detailed match processor along with the sequence of labels. The detailed match processor 1020 determines which of these supplied words is the most likely to correspond to the supplied sequence of labels.

The methods implemented by the search processor 1020, fast match processor 1006, detailed match processor 1008 and language model 1010 are substantially the same as those set forth in the above referenced U.S. Pat. No. 4,759,068. An exemplary implementation is described below.

In the recognition system shown in FIG. 3, each word in a dictionary is represented as a sequence of phonemes, also known as phones, and each phone is represented by a phone machine. A phone machine is a Markov model of the pronunciation of a phone which defines a probabilistic relationship between the phone and a sequence of labels.

In the fast match operation, the sequence of labels produced by the acoustic processor 1004 is matched, by the fast match processor 1006, to simplified phone machines representing words in the vocabulary. These words are arranged in a tree structure for use by the processor 1006, so that words having common initial phones have common paths through the tree until they are differentiated. The fast match processor 1006, provides a set of words that are more likely to match the sequence of labels than other words in the vocabulary. These words are then analyzed by the language model 1010 to eliminate any words that are unlikely based on their context in view of, for example, the two most recently recognized words. This process produces a relatively small set of candidate words which are then applied, with the sequence of labels provided by the acoustic processor 1004, to the detailed match processor 1008.

The detailed match operation uses a set of more rigorous phone machines to match the labels provided by the acoustic processor 1004 to the set of candidate words. An exemplary phone machine used by the detailed match processor is described below in reference to FIG. 4. Following this description, modifications to this phone machine to produce a simplified phone machine for the fast match processor 1006 are described.

Figure 4:
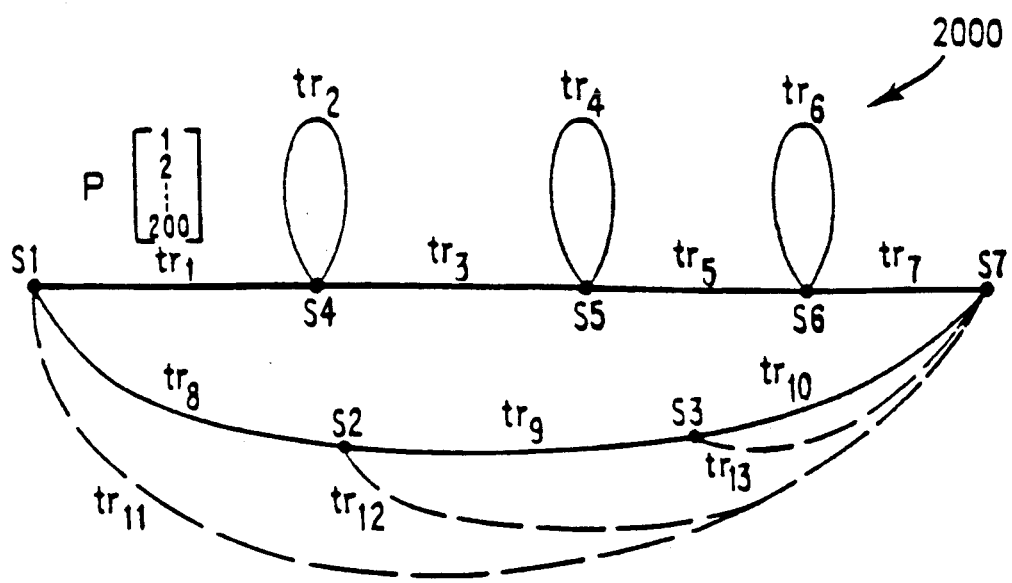
FIG. 4 (prior art) is a state diagram representing a Markov model which may be used in several contexts by the speech recognition system shown in FIG. 1.

A phone machine 2000, shown in FIG. 4, includes seven states, S1 through S7, and 13 transitions, tr1 through tr13, between selected ones of the states. Each transition has a probability associated with it and, in addition, each of these transitions except the ones indicated by broken lines (i.e. tr11, tr12, and tr13) has associated with it a vector of 200 probability values representing the probability that each of the respective 200 possible labels occurs at the transition. The broken-line transitions represent transitions from one state to another for which no time elapses and in which no label is produced. These transitions are referred to as null transitions. The solid-line transitions from one state to another. The broken-line transitions represent transitions from one state to another where there is no vocalization, in other words a bypass around labels which may be absent from the phoneme model. Where a transition both begins and ends in one state, it represents a vocalization that is held for more than one sample period (i.e. 1 centisecond).

In the detailed match processor 1008, the sequence of labels produced by the acoustic processor 1004 is matched to the sequences of phone machines associated with the respective candidate words produced by the fast match operation. An exemplary matching procedure which may be used in both the fast match processor 1006 and the detailed match processor 1008 is the "forward probability" technique described in an article by F. Jelinek, entitled "Continuous Speech Recognition by Statistical Methods" Proceedings of the IEEE, Vol. 64, 1976, pp. 532–556.

The model shown in FIG. 4 is simplified, for use by the fast match processor 1006, by replacing the each of the probability vectors associated with each of the respective transitions in the model by a single probability vector. The values in this vector are the largest values in the corresponding positions in all of the vectors of label probabilities associated with all of the transitions in the model. Many fewer calculations are needed to evaluate these simple phone machines than are needed to evaluate the more rigorous phone machines.

As set forth above, after both the fast match operation and the detailed match operation, the search processor 1020 invokes the language model 1010 to determine if the newly selected word fits in the context of the previously selected words. In addition to paring down the list of candidate words for application to the detailed match processor, the language model 1010 distinguishes between the set of homophones and near-homophones provided as a result of the detailed match operation. The language model used in the system shown in FIG. 3 is a three-gram language model, or, stated otherwise, a language model having statistics on the likelihood of occurrence of groups of three words.

The following example illustrates the operation of the language model 1010. Assume that the phrase "To be or not to be" has been spoken. After processing by the fast match and detailed match processor, a first homophone group, comprising "TO", "TOO" and "TWO" is determined by the search processor 1020. Since this is the start of the phrase, no context is available and so, the language model 1010 is invoked as one-gram model in place of the three-gram language model. The one-gram model determines which of the three words was most likely spoken. This homophone group is stored by the search processor 1020. When the next word is processed by the system, a second near-homophone group containing the words "BE", "BEE", "B" and "D" may be produced. The letter "D" is included in this group because it is a near-homophone of the other "B" words as set forth above. Based on these two groups of words, the words "TOO" and "BEE" are eliminated as being unlikely. This leaves three possible two-word combinations of "TO BE", "TWO B" and "TWO D". The next word applied to the recognizer produces a third homophone group containing the words "OR", "OAR" and "ORE". Applying this group and the possible two-word combinations to the language model eliminates the word "TWO" from the first group, the words "B" and "D" from the second group and the words "OAR" and "ORE" from the third group. This process continues until the entire phrase has been parsed.

The sequence of words determined by the search processor 1020 using the fast match processor 1006, the detailed match processor 1008 and the language model 1010, as outlined above, is the output of the speech recognition system.

But consider what results would be produced if the phrase had been "C EQUALS TWO B PLUS D". In this instance, the language model would have difficulty determining, just from context, which of the letters "C", "B" and "D" belongs in which position in the phrase. Consequently, the result produced by the speech recognition system would be at best a list of alternatives.

Figure 5:
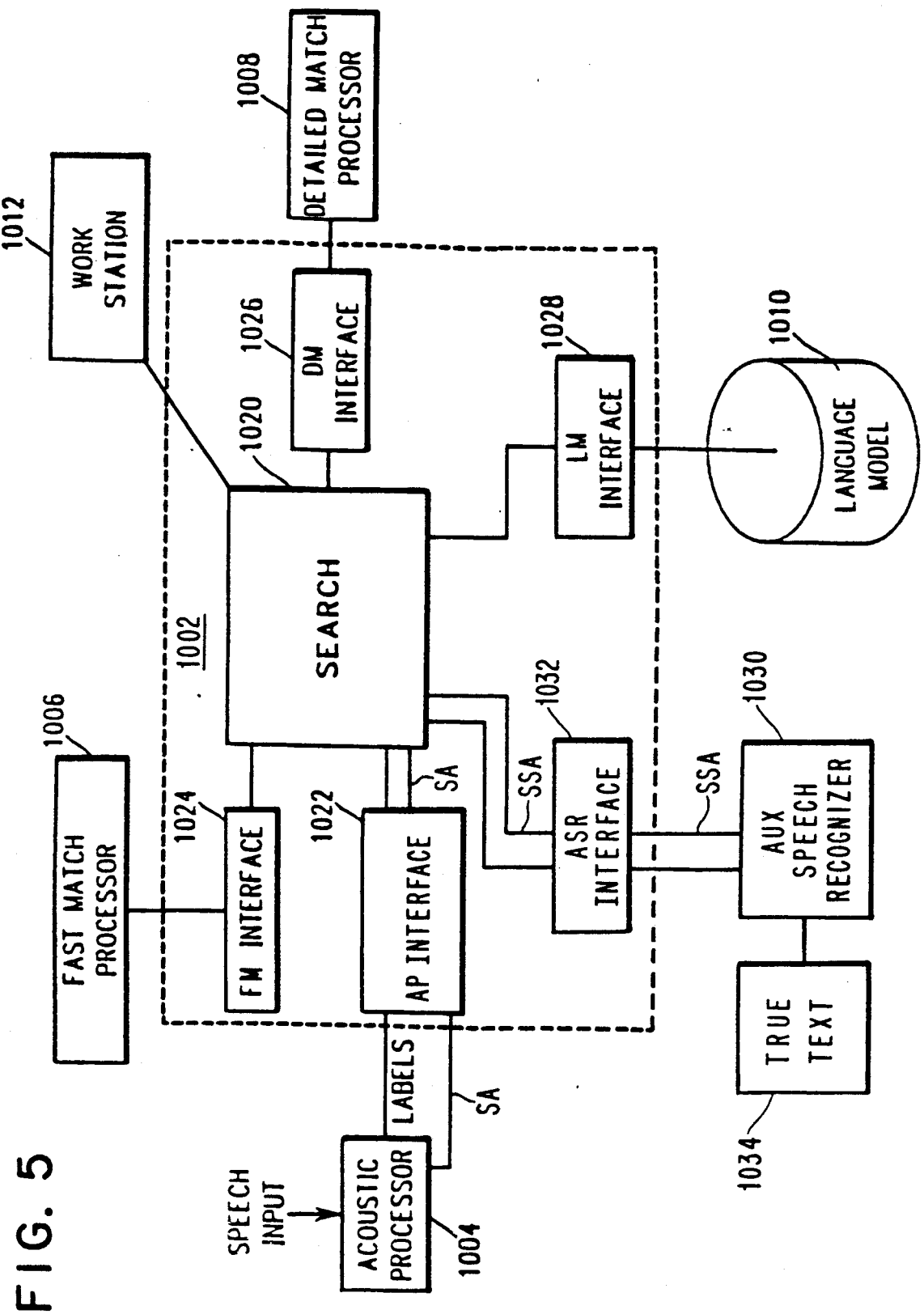
FIG. 5 is a block diagram of a speech recognition system which includes an embodiment of the present invention.

To solve this problem, a language recognition system in accordance with the present invention and shown in FIG. 5, includes an auxiliary speech recognizer (ASR) 1030 that communicates with the search processor 1020 via an ASR interface 1032. The ASR 1030 is coupled to receive a signal SSA from the search processor 1020. The signal SSA includes stored spectral analysis vector samples of the signal SA. In the present embodiment of the invention, the search processor 1020 is coupled to receive and store the signal SA provided by the acoustic processor 1004. When a target near-homophone is identified by the search processor 1020, it invokes the ASR 1030, providing it with stored spectral vector samples, representing only the target near-homophone, via a signal SSA. Although it is not shown, it is contemplated that the ASR 1030 may use the acoustic feature vectors, AF, provided by the feature selection element 1108, or other similar signals which characterize speech input to a voice recognition system.

The ASR 1030 uses a different type of speech recognition algorithm than that used by the speech recognition system shown in FIG. 3. The algorithm used by the ASR 1030 automatically learns to distinguish between words in a vocabulary and, so, is less likely to confuse near-homophones. According to the exemplary algorithm used with this embodiment of the invention, a set of acoustic match functions, one for each word in a set of near-homophones (e.g. B, C, D, E, G, P, T, V, and Z) are calculated for the vector signal SSA provided by the search processor 1020. Each of the acoustic match functions has three variable parameters, scalar $\beta$ and two vectors $\alpha$ and $\mu$. In a traning mode, the values of these parameters are adjusted according to an optimizing objective function to obtain the highest number of matches between recorded spoken near-homophones and a true text provided to the ASR 1030 by a source of true text 1034. When the optimal values for all of the parameters $\alpha$, $\beta$ and $\mu$ have been determined, the ASR 1030 may be used, in an operational mode, by the search processor 1002 to distinguish between near-homophones in the set.

The search processor 1002 may use the ASR 1030 to recognize near-homophones from more than one set. This can be accomplished by storing the optimal parameter values for each set and then loading the appropriate parameter values into the ASR 1030 before it is invoked to recognize the near-homophones in the set.

Figure 6:
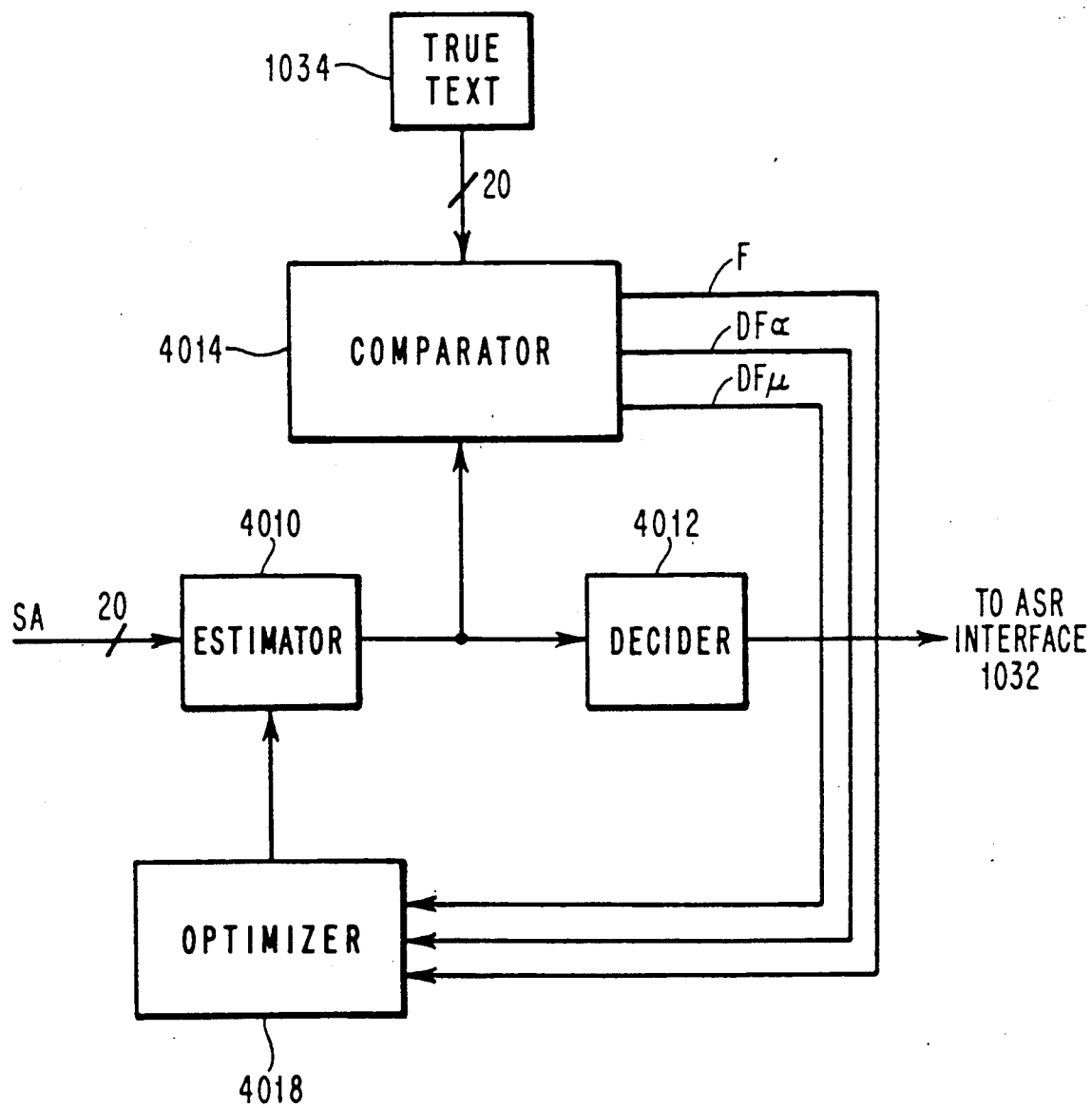
FIG. 6 is a block diagram of circuitry suitable for use as the auxiliary speech recognizer of the speech recognition system shown in FIG. 5.

FIG. 6 is a block diagram of circuitry suitable for use as the ASR 1030. In FIG. 6, the signals SSA provided by the search processor 1020 are applied to an estimator 4010. The estimator 4010, which implements the acoustic match equations, is coupled to receive updated parameter values for each of the equations from an optimizer 4018. The output signal provided by the estimator 4010 is group of values, each representing the occurrence of a respectively different one of the near-homophones in the set.

In the training mode, these values are compared, by a comparator 4014, against values representing the actual occurrence of the near-homophones, provided by the source of true-text 1034. The comparator 4014 provides an objective function, F, which indicates the result of the comparison, and two functions, DF$\alpha$ and DF$\mu$, which are the respective first partial derivatives of the function F with respect to $\alpha$ and $\mu$. Signals representing the respective values of these three functions are applied to the optimizer 4018. In the training mode, the optimizer 4018 uses the functions F, DF$\alpha$ and DF$\mu$ to adjust the values of the various $\alpha$ and $\mu$ parameters to reduce the difference between the estimated and actual occurrences of each of the near-homophones.

In the operational mode, the values produced by the estimator 4010 are applied to a decider 4012 which provides the most likely near-homophone to the search processor 1020.

The following is a mathematical description of the acoustic match function, the comparison function and the objective equation used to optimize the parameters $\alpha$ and $\mu$ of the acoustic match function. This is followed by a description, with reference to FIG. 7, of an exemplary computer program which implements the various processing elements shown in FIG. 6.

The mathematical model used by the auxiliary speech recognizer 1030 is a Poisson process model. According to this model, each type of speech event to be recognized (i.e. each near-homophone) has associated with it a distinct Poisson process. Stated otherwise, in any given time interval, the number of occurrences of each possible near-homophone is assumed conform to a distinct Poisson distribution.

The acoustic processor 1004 samples the speech signal and produces an acoustic description of the signal in the form of a vector of 200 components. The Poisson model recognizer attempts to calculate the intensities of point processes related to each speech event from the acoustic vector. In the present embodiment of the invention, the recognizer has a formula, the acoustic match equation, by which it calculates an estimated intensity of each process from the acoustic vector.

The acoustic match equation for the ith prototype near-homophone processed by the estimator 4010 has the form of equation (1).

$$m_i(t) = e^{-d_i^2(t) + \beta_i} \quad (1)$$

where $$d_i^2(t) = \sum_{j=1}^{200} a_{j,i}[x_j(t) - \mu_{j,i}]^2 \quad (2)$$

where $x_j(t)$ is the value of the jth spectral amplitude at the time t. Although the equation (1) has the form of a multivariate Gaussian density, it is not; it is instead, a representation of the estimated intensity of a Poisson process.

By integrating, or summing, the calculated intensity of a process over a time interval corresponding to the utterance of one of the target words, an expected incidence of events, that is to say an expected number of events which conform to that process and occur during that interval, is obtained. The more closely this number agrees with the actual number of events occurring in this interval, the better is the intensity estimate. Thus, the aim of the optimization is, for each acoustic match equation, to adjust the recognizer parameters, $\alpha$ and $\mu$, while the parameter $\beta$ is set to zero, to produce the best possible estimates of the actual number of occurrences for each word in the vocabulary during the training interval. When the parameters $\alpha$ and $\mu$ have been optimized for each acoustic match equation, the various $\beta$ parameters are adjusted so that, for the data in the training interval, the estimated numbers of occurrences for each word in the vocabulary equal the actual numbers of occurrences. Thus, the parameter $\beta$ may be considered to be a normalization factor. In this embodiment of the invention, it is not optimized in the same manner as the parameters $\alpha$ and $\mu$.

After it has been trained, the optimizer 4010 may be used to recognize unknown words. To do this, the estimator 4010 is invoked to evaluate the optimized equations (1) for each prototype using each acoustic vector of the unknown word. The values produced are summed to generate an estimated intensity for every prototype i. as set forth in equation (3).

$$\lambda_i = \sum_t m_i(t) \tag{3}$$

In the equation 3, the summation over the time interval t means the summation of all acoustic vectors provided during the time interval t, i.e. the acoustic vectors generated when the unknown word was uttered.

The auxiliary recognition system used in this embodiment of the invention is optimized by maximizing an objective function which defines the probability that the observed events would occur if the $\lambda$'s represent the expected events. In terms of the present example, if, during a given time interval, the word "B" is spoken, the objective function for that time interval would be the product of the probability that, during the time interval, the observed number of occurrences of the acoustic event "B" is one and that the observed number of occurrences of the other acoustic events, "C", "D", "E", "G", "P", "T", "V" and "Z" are all zero. This objective function is evaluated as set forth below.

In the training mode, the estimated count value, $\lambda_i$, and actual count values, $n_i$, for the i prototypes are provided to the comparator 4014. With this information, the comparator 4014 uses an equation (4), the Poisson distribution, to compute the likelihood of the observed sample given the estimated intensity of the ith prototype.

$$l_i = (\lambda_i^{n_i} e^{-\lambda_i})/n_i! \tag{4}$$

The objective function that the optimizer should maximize, in the training mode, is the product of the likelihoods for all of the i prototypes. However, instead of multiplying all of the $l_i$'s, the inventor has chosen to sum their natural logarithms. This is a fully equivalent operation and is more economical of processing resources especially since one of the factors of $l_i$ is an exponential. Furthermore, since procedures for minimizing objective functions, such as the modified Newton algorithm are fairly well known, the inventor has chosen to maximize the sum of the logarithms of the probabilities by minimizing their negative sum. Thus, if there are N prototypes, the objective function calculated by the comparator 4014 is given by an equation (5).

$$F = -\sum_{i=1}^{N} \ln l_i \tag{5}$$

As set forth in reference to FIG. 6, the signal F, generated by the comparator 4014 is applied to the optimizer 4018. Two other signals which are applied to the optimizer 4018 are the signals DF$\alpha$ and DF$\mu$, the partial first derivatives of the function F with respect to the respective variable parameters $\alpha$ and $\mu$.

The partial first derivatives of the objective function F with respect to $\alpha$ and $\mu$ are calculated by means of the chain rule of differentiation. The application of this rule is illustrated by an example. Assume that at some step, a quantity $y_j$ was calculated from some input values $x_1 \ldots x_k$. Let the computation be represented by a function f illustrated in equation (6).

$$y_j = f(x_1, x_2, \ldots, x_k) \tag{6}$$

Assume also that the partial derivative of the objective function F with respect to $y_j$ (i.e. $\delta F/\delta y_j$) is already known. The chain rule may be applied to calculate the partial derivatives of the objective function F with respect to the variables $x_1, x_2, \ldots, x_k$ (i.e. $\delta F/\delta x_i$). The first step in this process is to calculate the partial derivatives of the function f with respect to $x_1, x_2, \ldots, x_k$ (i.e. $\delta f/\delta x_i$). This can be done analytically if the function f is a known differentiable function and the values of $x_i$ and $y_j$ are known. Finally, partial derivatives of the objective function with respect to the $x_i$'s may be obtained using the equation (7) which is an application of the chain rule.

$$\delta y_j/\delta x_i = \sum_j (\delta F/\delta y_j)(\delta y/\delta x_i) \tag{7}$$

Using these methods, the partial derivatives of F with respect to each of the $l_i$'s is represented by the equation (8).

$$\delta F/\delta l_i = -1/l_i \tag{8}$$

The derivatives of the $l_i$'s with respect to the $\lambda_i$'s may be calculated and combined with equation (8) to produce the partial derivatives of F with respect to each of the $\lambda_i$'s, shown in equation (9).

$$\delta F/\delta \lambda_i = 1 - (n_i/\lambda_i) \tag{9}$$

Next, the derivatives of the $\lambda_i$'s with respect to the functions $m_i(t)$ are calculated, but this derivative is equal to unity so, the derivative is defined by equation (10).

$$\delta F/\delta m_i(t) = 1 - (n_i/\lambda_i) \tag{10}$$

In the next step, the derivatives of the functions $m_i(t)$ with respect to the functions $d_i^2(t)$ are calculated and combined with equation 10 to produce equation (11).

$$\delta F/\delta d_i^2(t) = -m_i(t) + m_i(t)(n_i/\lambda_i) \tag{11}$$

the partial derivatives of the functions $d_i^2(t)$ with respect to $\alpha_{j,i}$ and $\mu_{j,i}$ are calculated and combined with the equation (11) to produce the equations (12) and (13).

$$\delta F/\delta \alpha_{j,i} = \sum_t m_i(t)[(n_i/\lambda_i) - 1][x_j - \mu_{j,i}]^2 \tag{12}$$

$$\delta F/\delta \mu_{j,i} = \sum_t -2\alpha_{j,i} m_i(t)[(n_i/\lambda_i) - 1][x_j - \mu_{j,i}] \tag{13}$$

The equations (12) and (13) represent the respective functions DF$\alpha$ and DF$\mu$ that are applied to the optimizer 4018 by the comparator 4014.

It is noted that all of the discussions have dealt with a single word, spoken in a single time interval, for which the true count values, $n_i$ are known and for which the acoustic measurements $x_j(t)$ are available. However, the recognizer parameters $\alpha_{j,i}$ and $\mu_{j,i}$ are desirably adjusted over several time intervals. Thus, a "grand total" objective function, G, over, for example, M time intervals is defined by equation (14) and its derivatives with respect to the variable parameters $\alpha$ and $\mu$ are defined by equations (15) and (16).

$$G = \sum_{k=1}^{M} F_k \qquad (14)$$

$$\delta G/\delta \alpha_{i,j} = \sum_{k=1}^{M} \delta F_k/\delta \alpha_{i,j} \qquad (15)$$

$$\delta G/\delta \mu_{i,j} = \sum_{k=1}^{M} \delta F_k/\delta \mu_{i,j} \qquad (16)$$

The equations (14) through (16) define the functions used by the optimizer 4018 to adjust the various variable parameter values $\alpha$ and $\mu$. As set forth above, the parameter values $\beta$ are adjusted to normalize the expected count values m produced by the equation 1 so that the values m equal the actual count values for the vocabulary words in the training text.

As set forth above, the optimizer 4018, used in this embodiment of the invention, performs the optimizing function using a modified Newton algorithm. An exemplary program which implements this algorithm is the subroutine E04KDF available as a part of the NAG Fortran Library from the Numerical Algorithms Group, Inc., 1101 31st Street, Suite 100, Downers Grove, Ill. 60515-1263. This program will find the minimum value of a function with respect to multiple variable parameters when supplied with the function and its partial first derivatives with respect to the multiple parameters. It is contemplated that other optimization methods, such as the conjugate gradient method may also be used.

Regardless of the optimization program used, it is desirable that initial values be provided to the program for each of the variable parameters, $\alpha$ and $\mu$, of the objective function. The inventor has determined that satisfactory performance can be obtained by choosing an initial value of 1 for all of the $\alpha$ parameters and an initial value of 0 for all of the $\beta$ and $\mu$ parameters. However, these initial values may not be the best for all systems. The choice of initial values depends on many factors such as the nature of the acoustic vector entries and the similar characteristics of the acoustic vectors for all words in the set of near-homophones. One skilled in the art can determine suitable starting values for the parameters $\alpha$ and $\mu$ without undue experimentation.

When the optimal values for each of the variable parameters $\alpha_{j,i}$ and $\mu_{j,i}$ have been determined, the auxiliary speech recognizer 1030 may be switched to its operational mode and used to distinguish between words in the set of near-homophones for which it was trained.

Figure 7:
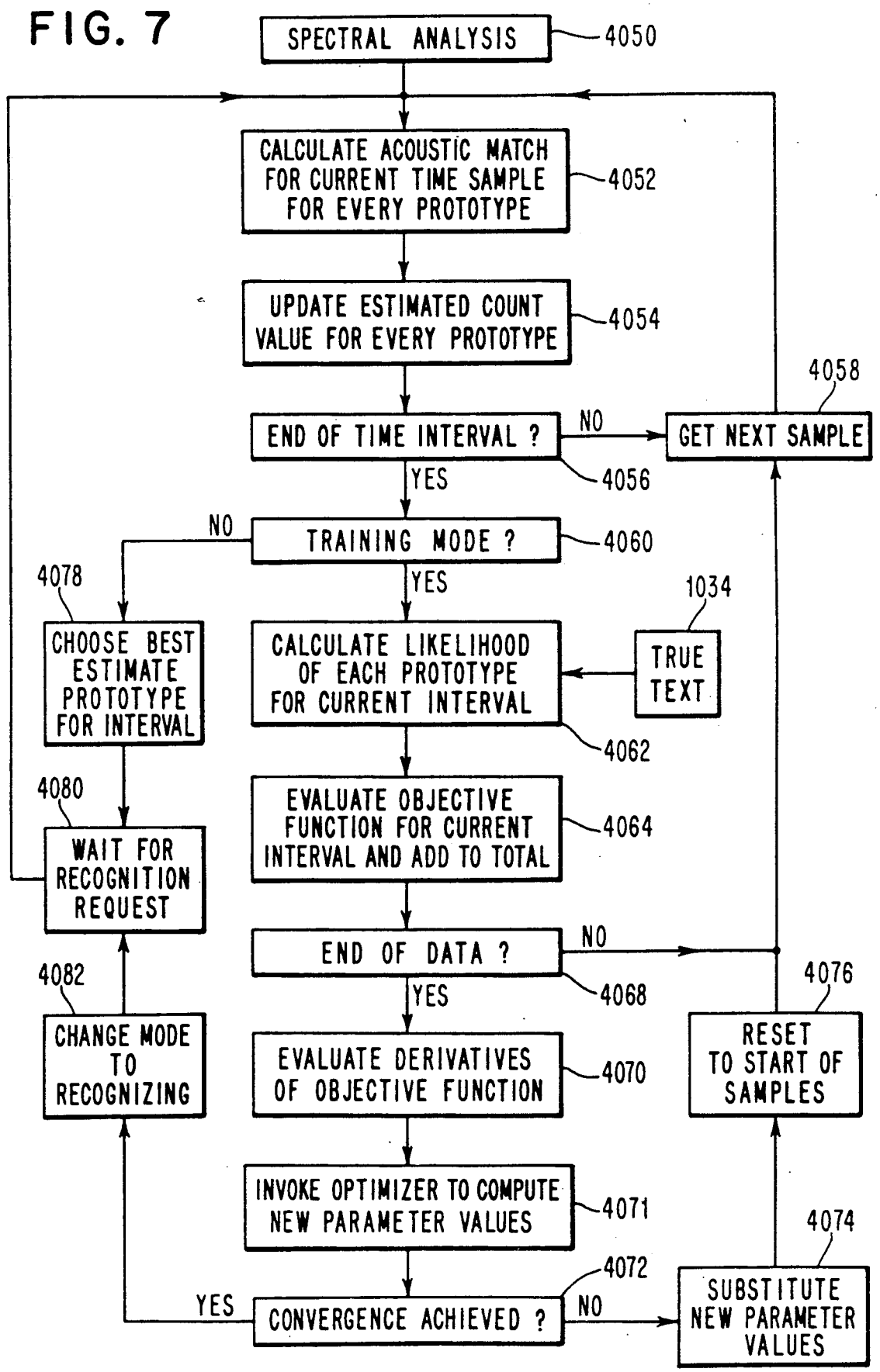
FIG. 7 is a flow chart illustrating the operation of the auxiliary speech recognizer shown in FIG. 6.

Although, the block diagram in FIG. 6 shows the ASR 1030 as including several interconnected blocks, in actuality, the ASR 1030 may be implemented as a digital computer operating under control of a program. FIG. 7 is a flow-chart diagram which illustrates the control flow of such a program. The first step, 4050, represents the spectral analysis input to the recognizer 1030. Whether the system is in the training mode or in the operational mode, this data and the equation (1) are used, at step 4052, to generate the acoustic match for the current time sample for every prototype word in the vocabulary of words to be recognized by the ASR. At step 4054, the results of the acoustic match function are summed (equation (3)), with previous results for the target time interval to update the estimated count value of each prototype. The next step, 4056, is a test to determine if the time sample just processed was the last in the target time interval. If it was not, step 4058 causes the program to get the next time sample and branch back to the step 4052.

If, at step 4056, it is determined that the most recently evaluated time sample was the last sample in the target interval, the step 4060 is executed to determine if the system is in its training mode or its operational mode. If the system is in its operational mode, the step 4078 is executed to determine the best prototype estimate for the current time interval. The step 4078 provides the word represented by this prototype as the output word of the ASR 1030. The step 4080, executed after the step 4078 places the system in an idle mode waiting for the next request from the search processor 1020.

If, at step 4060, it is determined that the system is in its training mode, step 4062 is executed. This step uses count values from the source of true text 1034 and the equation (4) to calculate, for each prototype word in the vocabulary, the likelihood that the word spoken in the target interval was the word represented by that prototype. This step compares the estimated counts, generated using the equation (1), for all possible words in the set of near-homophones to the actual counts of the words occurring in the time interval. Since, in the present embodiment of the invention, only one word is spoken in a given time interval, only the prototype corresponding to that word should generate an estimated count close to one.

After step 4062, step 4064 is executed. This step uses the equation (5) to determine the value of the objective function for the time interval. Next, at step 4068, a test is performed to determine if the most recently processed sample was the last sample of the training data. If not, the program branches to step 4058 to get the next sample. If, however, the last sample of training data has been processed, the step 4070 evaluates and sums the derivatives (equations (15) and (16)) of the objective function with respect to $\alpha$ and $\mu$. These values and the summed values of the objective function are applied to the optimizer program, at step 4072, to obtain new values for the various parameters $\alpha$ and $\mu$. These new parameter values are compared to the previous parameter values, at step 4072, to determine if the optimization algorithm has converged. If not, the new parameter values are substituted into the equation (1) at step 4074, the training data is reset to the first time sample, at step 4076, and the training process is restarted, via a branch to instruction 4058.

If, at step 4072, it is determined that convergence has been achieved, the next step, 4082, changes the mode of the ASR 1030 to its operational mode and branches to step 4080 to await the first recognition request from the search processor 1020.

While the speech recognition system shown in FIGS. 5 through 7 has been described as a special purpose adjunct to a more general speech recognition system, it is contemplated that a system substantially identical to the ASR 1030 may be used as a stand-alone speech recognition system. A system of this type may either be limited to recognizing a relatively small number of words, such as the system set forth above, or it may be configured to recognize words from a relatively large vocabulary.

The invention has been described with reference to a particular illustrative embodiment. It is to be understood, however, that various changes and modifications may be made by those skilled in the art without departing from the spirit and scope of the invention.

The invention claimed is:

1. A method of modeling the sounds produced by speaking at least first and second portions of speech, said method comprising the steps of:

uttering at least the first portion of speech N times in a time interval having a series of successive subintervals, where N is an integer greater than or equal to one;

measuring the value of at least one feature of the utterance of the first portion of speech during each of the series of successive subintervals to produce a series of feature vector signals representing the feature values;

estimating the expected number of occurrences of the first portion of speech in the time interval as a combination of the values for each subinterval of a first model function of the measured value of the feature of the utterance of the first portion of speech, said first model function having at least a first parameter having an initial value;

estimating the expected number of occurrences of the second portion of speech in the time interval as a combination of the values for each subinterval of a second model function of the measured value of the feature of the utterance of the first portion of speech, said second model function having at least a second parameter having an initial value;

estimating the probability of exactly N occurrences of the first portion of speech in the time interval given the estimated expected number of occurrences of the first portion of speech;

estimating the probability of exactly zero occurrences of the second portion of speech in the time interval given the estimated expected number of occurrences of the second portion of speech;

calculating revised values of the first and second parameters to improve the value of an objective function comprising a combination of at least the estimated probability of exactly N occurrences of the first portion of speech and the estimated probability of exactly zero occurrences of the second portion of speech;

modeling the first portion of speech with the first model function with the revised value of the first parameter; and modeling the second portion of speech with the second model function with the revised value of the second parameter.

2. A method as claimed in claim 1, characterized in that:

each portion of speech is a word; and
the revised values of the first and second parameters are calculated to substantially optimize the value of the objective function.

3. A method as claimed in claim 2, characterized in that:

N is equal to one;

the values of the first model function are combined by arithmetic averaging to estimate the expected number of occurrences of the first portion of speech; and the values of the second model function are combined by arithmetic averaging to estimate the expected number of occurrences of the second portion of speech.

4. A method as claimed in claim 2, characterized in that the model function of a word $W_i$ has the form $$m_i(t) = e^{-d_i^2(t) + \beta_i},$$

where $$d_i^2(t) = \sum_{j=1}^{q} \alpha_{j,i} [x_j(t) - \mu_{j,i}]^2,$$

q is the number of acoustic features of the utterance being measured, and $\alpha_{j,i}$, $\beta$, and $\mu_{j,i}$ are parameters of the model functions.

5. A method as claimed in claim 4, characterized in that the probability of exactly $n_i$ occurrences of a word $W_i$ in a time interval T having subintervals $\Delta t$ given the estimated expected number of occurrences of the word is estimated from a function of the form $$l_i = \frac{\lambda_i^{n_i} e^{-\lambda_i}}{n_i!}$$

where $$\lambda_i = \sum_T m_i(t) \Delta t.$$

6. A method as claimed in claim 2, characterized in that the objective function comprises the product of at least the estimated probability of exactly N occurrences of the first portion of speech and the estimated probability of exactly zero occurrences of the second portion of speech.

7. A method as claimed in claim 2, characterized in that the objective function comprises the sum of the logarithms of at least the estimated probability of exactly N occurrences of the first portion of speech and the estimated probability of exactly zero occurrences of the second portion of speech.

8. A method of modeling the sounds produced by speaking at least a first portion of speech, said method comprising the steps of:

uttering at least the first portion of speech N times in a time interval having a series of successive subintervals, where N is an integer greater than or equal to one;

measuring the value of at least one feature of the utterance of the first portion of speech during each of the series of successive subintervals to produce a series of feature vector signals representing the feature values;

estimating the expected number of occurrences of the first portion of speech in the time interval as a combination of the values for each subinterval of a first model function of the measured value of the feature of the utterance of the first portion of speech, said first model function having at least a first parameter having an initial value;

estimating the probability of exactly N occurrences of the first portion of speech in the time interval given the estimated expected number of occurrences of the first portion of speech;

calculating a revised value of the first parameter to improve the value of an objective function comprising at least the estimated probability of exactly N occurrences of the first portion of speech; and modeling the first portion of speech with the first model function with the revised value of the first parameter.

* * * * *